(12) United States Patent
Hoffmann et al.

(10) Patent No.: US 12,416,288 B1
(45) Date of Patent: Sep. 16, 2025

(54) SYSTEM AND METHOD FOR CONTROLLING A SPEED OF A WIND TURBINE

(71) Applicant: GE Infrastructure Technology LLC, Greenville, SC (US)

(72) Inventors: Till Hoffmann, Osnabrueck (DE); Thomas Franklin Perley, Bluffton, SC (US); Ian Couchman, Horley (GB)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/899,373

(22) Filed: Sep. 27, 2024

(51) Int. Cl.
    *F03D 7/04*     (2006.01)
    *F03D 17/00*     (2016.01)

(52) U.S. Cl.
    CPC .......... *F03D 7/042* (2013.01); *F03D 17/005* (2023.08); *F05B 2270/327* (2013.01)

(58) Field of Classification Search
CPC ... F03D 7/00; F03D 7/02; F03D 7/042; F03D 17/00–026
See application file for complete search history.

(56) References Cited

U.S. PATENT DOCUMENTS

| | | | |
|---|---|---|---|
| 8,092,174 B2 | 1/2012 | Egedal | |
| 10,365,296 B2 * | 7/2019 | Askarpour | G06F 17/18 |
| 10,429,207 B2 * | 10/2019 | Fukushima | G01C 25/00 |
| 10,436,181 B2 | 10/2019 | Slack et al. | |
| 2024/0240613 A1 * | 7/2024 | Kiib | G01P 3/48 |

FOREIGN PATENT DOCUMENTS

| | | |
|---|---|---|
| WO | WO2007/104585 A1 | 9/2007 |
| WO | WO2022/228630 A1 | 11/2022 |

OTHER PUBLICATIONS

Plaza et al., Triaxial Accelerometer Based Azimuth Estimator for Horizontal Axis Wind Turbines, Journal of Wind Engineering & Industrial Aerodynamics, vol. 240, 2023, 105-463.

* cited by examiner

*Primary Examiner* — Christopher R Legendre
(74) *Attorney, Agent, or Firm* — Dority & Manning, P.A.

(57) ABSTRACT

A method for controlling a wind turbine includes receiving, via a control system, at least one speed measurement from at least one sensor on a drivetrain of the wind turbine. The method also includes receiving, via the control system, at least one rate gyroscope speed measurement from at least one rate gyroscope on the drivetrain of the wind turbine. The method also includes calculating, via the control system, an offset for the at least one rate gyroscope speed measurement as a function of the at least one speed measurement. The method also includes adjusting, via the control system, the at least one rate gyroscope speed measurement by the offset. The method also includes implementing, via the control system, a control action for the wind turbine based on the adjusted at least one rate gyroscope speed measurement.

20 Claims, 4 Drawing Sheets

SYSTEM AND METHOD FOR CONTROLLING A SPEED OF A WIND TURBINE

FIELD

The present disclosure generally relates to wind turbines and, more particularly, to a system and method for controlling a speed of a wind turbine.

BACKGROUND

Wind power is considered one of the cleanest, most environmentally friendly energy sources presently available, and wind turbines have gained increased attention in this regard. A modern wind turbine typically includes a tower, a nacelle mounted atop the tower, a rotor mounted to the nacelle having one or more rotor blades, and a drivetrain within the nacelle. The drivetrain typically includes various drivetrain components, such as a generator and a gearbox. Further, the drivetrain can contain one or more friction connections, e.g., couplings or shrink fits in either the high-speed shaft (HSS) section or the low-speed shaft (LSS) section. The nacelle includes a rotor assembly coupled to the gearbox and to the generator. In many wind turbines, the generator and the gearbox are mounted to a bedplate within the nacelle via one or more torque arms. As such, the one or more rotor blades capture kinetic energy of wind using known airfoil principles. The rotor blades transmit the kinetic energy in the form of rotational energy so as to turn a shaft coupling the rotor blades to the gearbox, or if the gearbox is not used, directly to the generator. The generator then converts the mechanical energy to electrical energy that may be deployed to a utility grid.

Oftentimes, the wind turbine may be equipped with various sensors for measuring parameters and/or conditions thereof. For example, some wind turbines may be equipped with certain types of gyroscopes, such as modern micro-electro-mechanical system (MEMS) gyroscopes that are used for rotor overspeed protection in a wind turbine. MEMS gyroscopes, however, tend to drift over time and temperature and can thus develop a significant measurement error over the allowed operating temperature range of e.g., −30° C. to +40° C. ambient, in the range of +/−5% of the expected speed range. Accordingly, a state of the art method to compensate for such drift is to combine the rate gyro measurement with an accelerometer, also referred to as "sensor fusion". The idea of this fusion is that the accelerometer does not drift relative to gravity over time and temperature and can be used to remove the offset of the gyro.

However, wind turbine application challenges this approach since an accelerometer can never only measure gravity but will rather be influenced by accelerations of the machine on top of the tower. Modern machines on large towers face larger issues with the fusion approach given the higher structural flexibility and related movements. As a result, the gyro drift compensation will become less accurate since it is influenced by mainly lateral accelerations of the complete system on top of the tower.

Accordingly, control systems which rely on an accurate determination of various conditions of the wind turbine as e.g., measured by rate gyros, such as pitching systems, may fail to correctly control the wind turbine. Thus, as a result of the discrepancy between the reported condition and the actual condition, corrective actions taken by systems associated with overspeed conditions may result in the wind turbine performing in a suboptimal manner.

As such, the present disclosure is directed to improved systems and methods controlling a speed of a wind turbine.

BRIEF DESCRIPTION

Aspects and advantages of the invention will be set forth in part in the following description, which may be obvious from the description or may be learned through practice of the invention.

In one aspect, a method for controlling a wind turbine is provided. The method includes receiving, via a control system, at least one speed measurement from at least one sensor on a drivetrain of the wind turbine. The method also includes receiving, via the control system, at least one rate gyroscope speed measurement from at least one rate gyroscope on the drivetrain of the wind turbine. The method also includes calculating, via the control system, an offset for the at least one rate gyroscope speed measurement as a function of the at least one speed measurement. The method also includes adjusting, via the control system, the at least one rate gyroscope speed measurement by the offset. The method also includes implementing, via the control system, a control action for the wind turbine based on the adjusted at least one rate gyroscope speed measurement.

In an embodiment, the at least one speed measurement from the at least one sensor on the drivetrain includes at least one of a generator speed measurement or a high-resolution rotor speed measurement.

In an embodiment, calculating the offset for the at least one rate gyroscope speed measurement as the function of the at least one speed measurement further includes calculating the offset for the at least one rate gyroscope speed measurement as a function of at least one speed measurement and a gearbox ratio.

In an embodiment, calculating the offset for the at least one rate gyroscope speed measurement as the function of the at least one speed measurement further includes dividing the at least one speed measurement by a gearbox ratio to obtain a quotient and subtracting the at least one rate gyroscope speed measurement from the quotient to provide the offset.

In an embodiment, adjusting the at least one rate gyroscope speed measurement by the offset further includes subtracting the offset from the at least one rate gyroscope speed measurement.

In an embodiment, the method further includes calculating the offset based on time.

In an embodiment, the method further includes calculating the offset based on temperature.

In an embodiment, the at least one rate gyroscope includes a plurality of rate gyroscopes with at least one of the plurality of rate gyroscopes associated with each pitch system of each rotor blade of the wind turbine.

In an embodiment, the at least one rate gyroscope speed measurement includes a plurality of rate gyroscope speed measurements, wherein at least one of the plurality of rate gyroscope speed measurements is measured from each of the plurality of rate gyroscopes, wherein the method further includes independently calculating individual offsets for the plurality of rate gyroscope speed measurements from the plurality of rate gyroscopes.

In an embodiment, the individual offsets are calculated at different times.

In an embodiment, the method further includes comparing, via the control system, the individual offsets with a predetermined range, and adjusting, via the control system, the plurality of rate gyroscope speed measurements by the corresponding individual offsets using any of the individual offsets that are within the predetermined range.

In an embodiment, implementing, via the control system, the control action includes at least one of uprating or derating the drivetrain via the control system, pitching at least one rotor blade of the wind turbine via a pitch adjustment mechanism controlled by the control system, reducing a speed of the wind turbine or shutting down the wind turbine when the adjusted at least one rate gyroscope speed measurement is indicative of an overspeed condition.

In another aspect, a system for controlling a wind turbine is provided. The system includes at least one sensor mounted to a drivetrain of the wind turbine. The system also includes at least one rate gyroscope mounted to the drivetrain of the wind turbine. The system also includes a control system including at least one processor configured to perform a plurality of operations, the plurality of operations including receiving at least one speed measurement from the at least one sensor on the drivetrain of the wind turbine; receiving at least one rate gyroscope speed measurement from the at least one rate gyroscope on the drivetrain of the wind turbine; calculating an offset for the at least one rate gyroscope speed measurement as a function of the at least one speed measurement; adjusting the at least one rate gyroscope speed measurement by the offset; and implementing, via the control system, a control action for the wind turbine based on the adjusted at least one rate gyroscope speed measurement.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of an embodiment can be used with another embodiment to yield a still further embodiment. Thus, it is intended that the present invention covers such modifications and variations as come within the scope of the appended claims and their equivalents.

Generally, the present disclosure is directed to systems and methods for controlling a speed of a wind turbine. In particular, the present disclosure is directed to systems and methods for calibrating angular rate gyroscopes used for rotor speed estimation and overspeed protection in a wind turbine. For example, an approach of the present disclosure is to solve the drift compensation problem using a robust, non-drifting reference speed measurement on the drivetrain. This can either be the generator speed measurement or a high-resolution rotor speed measurement. Thus, systems and methods of the present disclosure provide more accurate measurements from rate gyroscopes such that control actions depending on same are more effective.

More specifically, in an embodiment, systems and methods of the present disclosure include receiving a speed measurement from a sensor on a drivetrain of the wind turbine and a rate gyroscope speed measurement from a rate gyroscope on the drivetrain of the wind turbine. The method then includes calculating an offset for the rate gyroscope speed measurement as a function of the speed measurement associated with the drivetrain. Further, the method includes adjusting the rate gyroscope speed measurement by the offset and implementing a control action for the wind turbine.

Accordingly, the systems and methods of the present disclosure are configured to provide an improved framework for controlling a wind turbine through the use of rate gyroscope speed measurements having greater accuracy than previously was achievable. In particular, systems and methods of the present disclosure provide rate gyroscope speed measurements that can compensate for conditions inherent to gyroscopes, such as measurement drift. Further, systems and methods of the present disclosure can also account for extreme conditions that result in an error in the calibration of the rate gyroscope.

Figure 1:
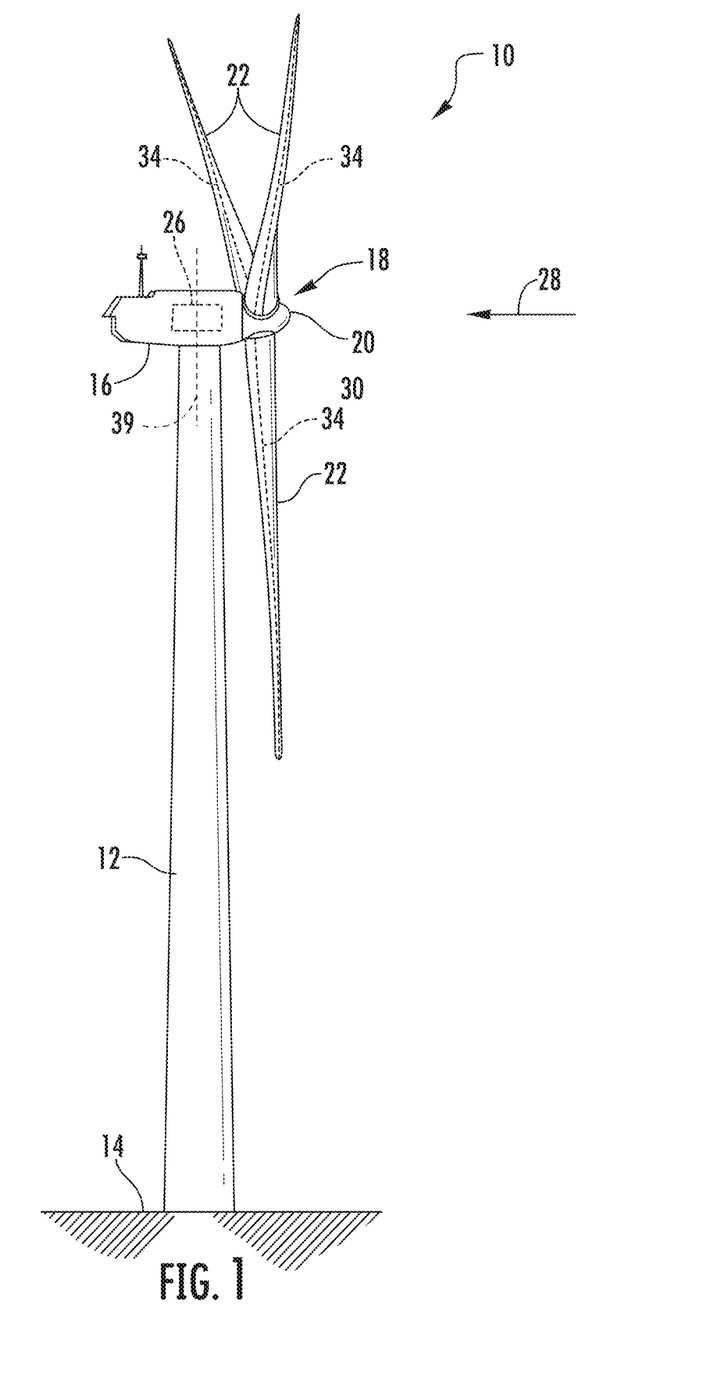
FIG. 1 illustrates a perspective view of an embodiment of a wind turbine according to the present disclosure.

Referring now to the drawings, FIG. 1 illustrates a perspective view of an embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
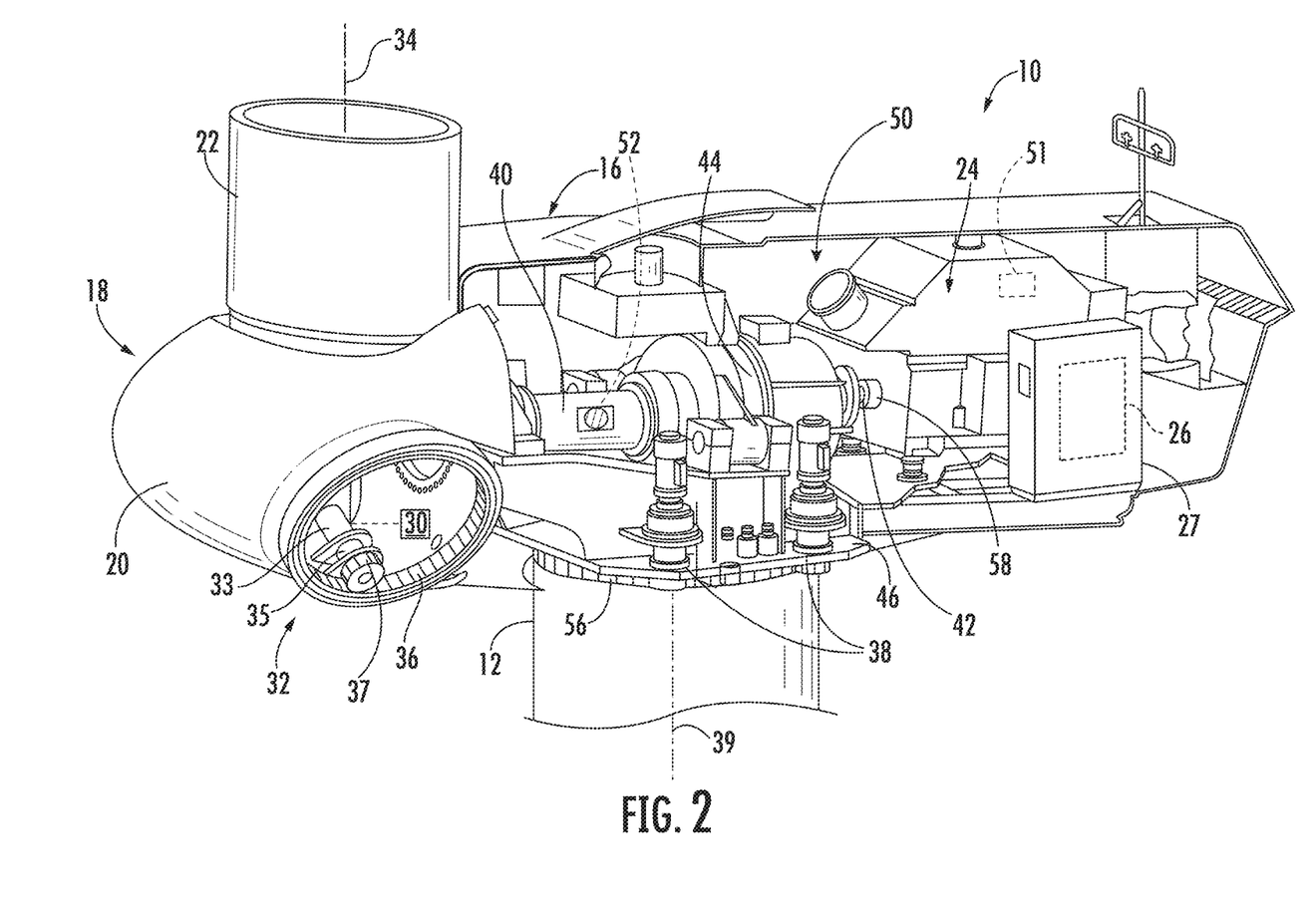
FIG. 2 illustrates a simplified, internal view of one embodiment of a nacelle of a wind turbine according to the present disclosure.

Referring now to FIG. 2, a simplified, internal view of an embodiment of the nacelle 16 of the wind turbine 10 is illustrated. As shown, the wind turbine 10 includes a generator 24 disposed within the nacelle 16. In general, the generator 24 may be coupled to the rotor 18 of the wind turbine 10 for generating electrical power from the rotational energy generated by the rotor 18. For example, the rotor 18 may include a main shaft or rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40. Such components may be generally referred to herein as a drivetrain 50 or drivetrain assembly.

It should be appreciated that the rotor shaft 40 may generally be supported within the nacelle 16 by a support frame or bedplate 46 positioned atop the wind turbine tower 12. For example, the rotor shaft 40 may be supported by the bedplate 46 via a pair of pillow blocks mounted to the bedplate 46.

As shown in FIGS. 1 and 2, the wind turbine 10 may also include a control system 26 within the nacelle 16. For example, as shown in FIG. 2, the control system 26 is disposed within a control cabinet 27 mounted within the nacelle 16. However, it should be appreciated that the control system 26 may be disposed at any location on or in the wind turbine 10, at any location on the support surface 14 (FIG. 1), or, generally, at any other location. The control system 26 may generally be configured to control the various operating modes (e.g., start-up or shut-down sequences) and/or components of the wind turbine 10.

Still referring to FIG. 2, the wind turbine 10 may further include at least one pitch adjustment mechanism 32 for each of the rotor blades 22 that is configured to rotate each rotor blade 22 about its pitch axis 34. In an embodiment, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 36 coupled between the hub 20 and a corresponding rotor blade 22 such that rotation of the pitch drive pinion 37 causes rotation of the pitch bearing 36. Thus, in such embodiments, rotation of the pitch drive motor 33 drives the pitch drive gearbox 35 and the pitch drive pinion 37, thereby rotating the pitch bearing 36 and the rotor blade 22 about the pitch axis 34. Similarly, the wind turbine 10 may include one or more yaw drive mechanisms 38 communicatively coupled to the control system 26, with each yaw drive mechanism(s) 38 being configured to change the angle of the nacelle 16 relative to the wind (e.g., by engaging a yaw bearing 56 of the wind turbine 10 and rotating the nacelle 16 about a yaw axis 39).

Further, as shown, the control system 26 may also be communicatively coupled to each pitch adjustment mechanism 32 of the wind turbine 10 through a separate or integral pitch controller 30 (FIG. 1) for controlling and/or altering the pitch angle of each respective rotor blade 22 (i.e., an angle that determines a perspective of the rotor blades 22 with respect to the direction 28 of the wind).

In addition, as shown in FIG. 2, one or more sensors 51, 52 may be provided on the wind turbine 10. Each of these sensors 51, 52 may assist in monitoring various conditions of the wind turbine 10.

As shown in FIG. 2, the sensor 51 may be communicatively coupled with the drivetrain 50 and be capable of monitoring various conditions, such as a speed measurement or derivatives thereof. For example, as shown, the sensor 51 is mounted to the generator 24 of the drivetrain 50 for detecting speed conditions associated with the generator 24. In addition, the sensor 51 may be capable of measuring rotor speed.

Additionally, the sensor 52 may also be mounted along the drivetrain 50 for measuring various speed conditions. For example, in an embodiment, the sensor 52 may be a rate gyroscope configured to generate a rate gyroscopic speed measurement.

It should be further understood that any number of sensors may be provided for measuring multiple conditions associated with the drivetrain 50. For example, a plurality of sensors, such as a plurality of rate gyroscopes, may be provided and associated with individual pitch adjustment mechanism 32

Further embodiments of sensors may include any other suitable type of sensor, such as wind vanes, accelerometers, or similar. As such, the sensors 51, 52 may further be in communication with the control system 26 and may provide related information to the control system 26. Further embodiments of sensors 51, 52 may include any other suitable type of sensor, such as wind vanes, anemometers, yaw sensors, pitch sensors, torque sensors, temperature sensors, vibration sensors, speed sensors, power output sensors, environmental sensors, pitch angle sensors, wind shear sensors, or similar.

It should also be appreciated that, as used herein, the term "monitor" and variations thereof indicate that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the control system 26 to determine the condition.

Figure 3:
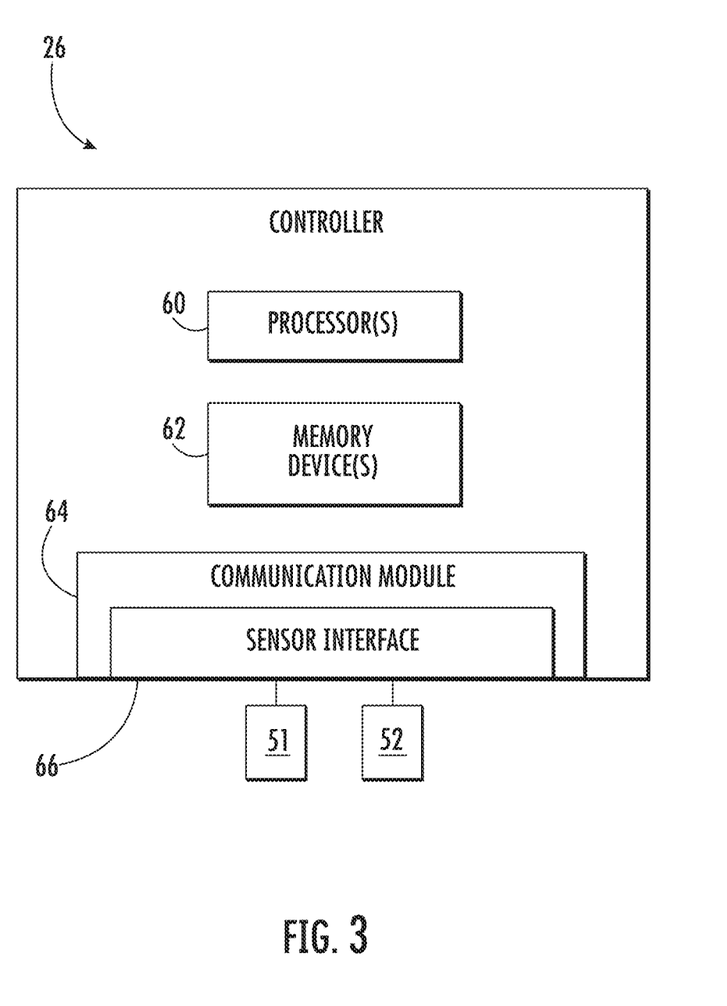
FIG. 3 illustrates a block diagram of an embodiment of a controller according to the present disclosure.

Referring now to FIG. 3, a block diagram of an embodiment of suitable components that may be included within the control system 26 according to the present disclosure is illustrated. As shown, the control system 26 may include one or more processor(s) 60 and an associated memory device(s) 62 configured to perform a variety of computer-implemented functions (e.g., performing the methods, steps, calculations, and the like and storing relevant data as disclosed herein).

Additionally, the control system 26 may also include a communications module 64 to facilitate communications between the control system 26 and the various components of the wind turbine 10. Further, the communications module 64 may include a sensor interface 66 (e.g., one or more analog-to-digital converters) to permit signals transmitted from one or more sensors 51, 52 to be converted into signals that can be understood and processed by the processor(s) 60. It should be appreciated that the sensors 51, 52 may be communicatively coupled to the communications module 64 using any suitable means. For example, as shown in FIG. 3, the sensors 51, 52 are coupled to the sensor interface 66 via a wired connection. However, in other embodiments, the sensors 51, 52 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer-readable medium (e.g., random access memory (RAM)), computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller(s) 26 to perform various functions including, but not limited to, transmitting suitable control signals to implement corrective action(s) in response to a distance signal exceeding a predetermined threshold as described herein, as well as various other suitable computer-implemented functions.

Figure 4:
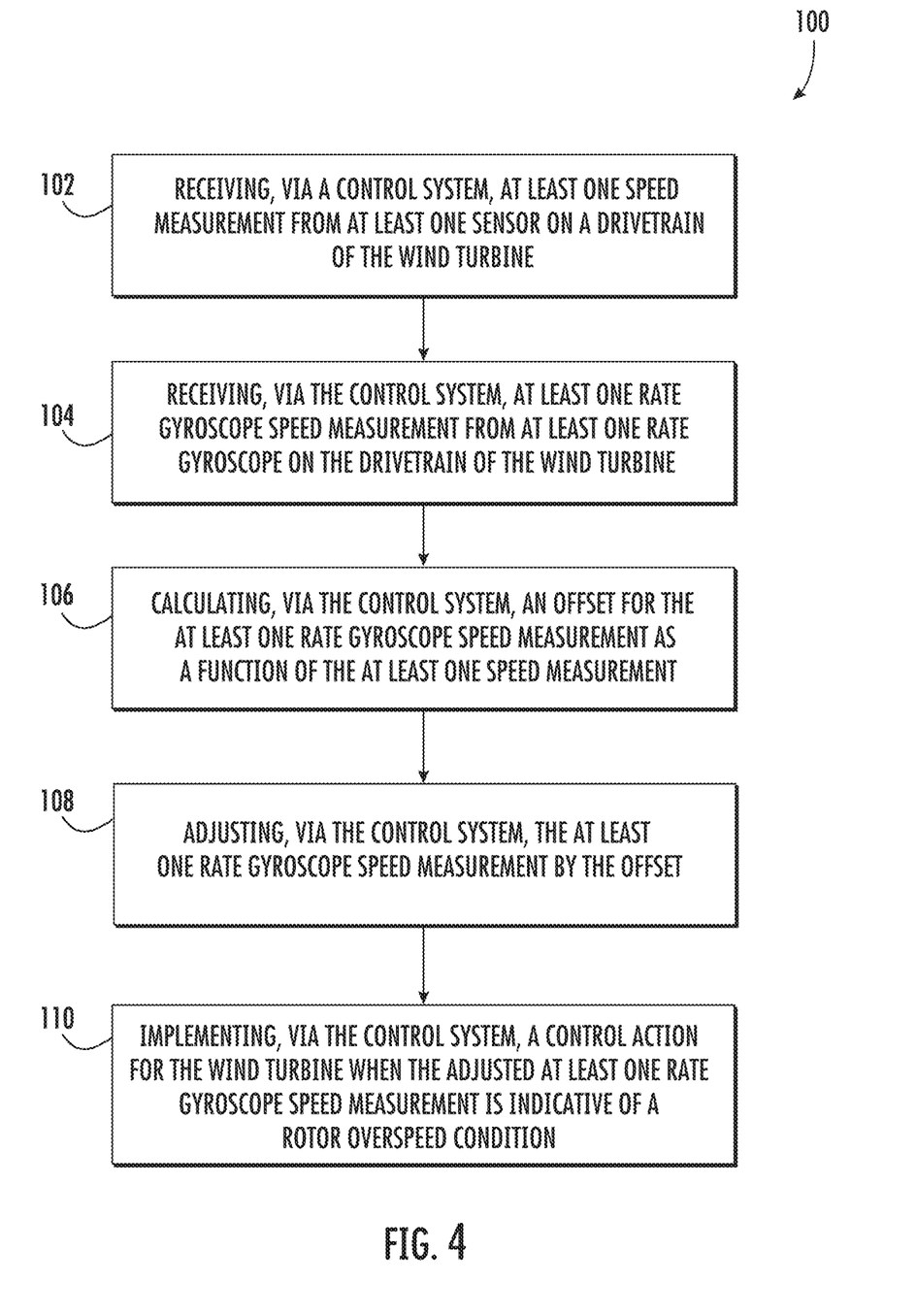
FIG. 4 illustrates a simplified diagram of an embodiment of a method for controlling a wind turbine according to the present disclosure.

Referring now to FIG. 4, a flow diagram of an embodiment of a method 100 for controlling a wind turbine is illustrated. The method 100 may be implemented using, for instance, the wind turbine 10, the control system 26, and any of the components associated with or contained within the wind turbine 10 discussed above with reference to FIGS. 1-3. FIG. 4 depicts steps performed in a particular order for purposes of illustration and discussion. Those of ordinary skill in the art, using the disclosures provided herein, will understand that various steps of the method 100 or any of the other methods disclosed herein may be adapted, modified, rearranged, performed simultaneously, or modified in numerous ways without deviating from the scope of the present disclosure.

As shown at (102), the method 100 includes receiving, via a control system, at least one speed measurement from at least one sensor on a drivetrain of the wind turbine. For example, the speed measurement may be received from sensor 51 which is communicatively coupled with the drivetrain 50. As described above, the speed measurement on the drivetrain 50 may include a generator speed measurement, a rotor speed measurement, or any combinations or derivatives thereof.

As shown at (104), the method 100 includes receiving, via the control system, at least one rate gyroscope speed measurement from at least one rate gyroscope on the drivetrain of the wind turbine. For example, the rate gyroscope speed measurement may be received from sensor 52, which may be a rate gyroscope. In addition, as described above, a plurality of rate gyroscopes may be provided where each of the individual rate gyroscopes is associated with each pitch system (such as the pitch adjustment mechanism 32) of each rotor blade 22 of the wind turbine 10. Thus, in various embodiments, multiple rate gyroscopes may be provided so that multiple calculations of offsets and adjusted rate gyroscope speed measurements may be received.

As shown at (106), the method 100 includes calculating, via the control system, an offset for the rate gyroscope speed measurement(s) as a function of the speed measurement(s). For example, the offset may be calculated to correct any possible errors that naturally occur in a rate gyroscope during normal or extreme operating conditions, such as a signal drift. In particular, in an embodiment, the offset may be calculated through the use of a function that incorporates the speed measurement and a ratio of the gearbox 44. More particularly, the offset may be calculated by dividing the speed measurement (received from sensor 51) by a known gearbox ratio for the gearbox 44 to obtain a quotient. The quotient may then be subtracted from the rate gyroscope speed measurement (received from sensor 52) to determine the offset.

In addition, if multiple rate gyroscopes are provided, the calculation of the offset may include independently calculating individual offsets for the plurality of rate gyroscope speed measurements from the plurality of rate gyroscopes. Thus, by including a plurality of rate gyroscope speed measurements, the accuracy of the overall gyroscope measurements of the drivetrain 50 and the wind turbine 10 can be improved.

Additionally, in an embodiment, calculating the offset may be scheduled to occur at predetermined time periods or may be based on one or more environmental conditions. For example, the predetermined time period may be at least every minute to every 24 hours, such as at least every 5 minutes to every 12 hours, such as at least every 10 minutes to every hour.

To prevent an unintended offset calculation during extreme events like sensor failures, it is advantageous to use multiple gyroscopes, e.g. one associated with each pitch system, and schedule the calibration individually. For example, the use of multiple gyroscopes to calibrate individually may include calculating a first offset using a first sensor 52 associated with a first pitch adjustment mechanism 32 associated with a first rotor blade at a first time interval, calculating a second offset using a second sensor 52 associated with a second pitch adjustment mechanism 32 associated with a second rotor blade at a second time interval, and calculating a third offset using a third sensor 52 associated with a third pitch adjustment mechanism 32 associated with a third rotor blade at a third time interval. By providing such a calibration, it is possible to provide more accurate offsets that can be used to more reliably detect overspeed and control the speed of the wind turbine 10. However, it should be understood that any number of a plurality of offsets may be calculated to improve offset accuracy as presently described.

Alternatively, or in addition to calculating offsets at different time periods, the offset may be calculated based on one or more environmental conditions. For example, the offset may be calculated when sensors associated with the wind turbine 10 detect a temperature above a certain threshold or a temperature change. Specifically, if the temperature around the wind turbine 10 reaches a level where sensor drift has an increased probability of occurrence, an offset calculation may be provided to ensure that the rate gyroscope speed measurements are accurately calculated to avoid the occurrence of overspeed due to improper calibration thereof. In addition, if the temperature changes by a certain amount, an offset calculation may be implemented to ensure the accuracy of the measurements received from the rate gyroscope(s).

Further, the individual offsets may be compared with each other to determine if the individual offsets should be utilized. In particular, if an individual offset is outside of range of values that is indicative of an incorrect calculation, it may be desirable to have a way of filtering these particular offsets out. To this end, the method 100 may also include comparing individual offsets with a predetermined range and adjusting the plurality of rate gyroscope speed measurements by the corresponding individual offsets using any of the individual offsets that are within the predetermined range. For example, if a corresponding offset for a rate gyroscope speed measurement observed from one gyroscope is outside of a predetermined range but another corresponding offset is not, then the method 100 may include using the corresponding offset that is within the range to adjust the rate gyroscope speed measurement associated with the rate gyroscope from which the measurement was acquired.

In another example, the method 100 may also include comparing individual offsets with each other and using any of the individual offsets that do not exceed a threshold value from the other individual offsets. For example, if one individual offset exceeds the other individual offsets by a predetermined value, it may be desirable to remove this particular offset for the adjustment of the rate gyroscope speed measurement from the corresponding rate gyroscope so that the accuracy of the rate gyroscope may be maintained. Said differently, each of these examples of comparing offsets to either a range or each other may avoid an unintended adjustment of a rate gyroscope with an incorrect offset by filtering the incorrect offsets (offsets which exceed a range or exceed a threshold value relative to other offsets) out from the adjustment of rate gyroscope speed measurements.

Referring still to FIG. 4, as shown at (108), the method 100 includes adjusting, via the control system, the rate gyroscope speed measurement(s) by the offset. For example, in an embodiment, adjusting the rate gyroscope speed measurement(s) may include subtracting the offset from the rate gyroscope speed measurement. In particular, because the offset is a function of the speed measurement from a first sensor that is unrelated to the rate gyroscope, it is possible to ensure that the adjustment of the rate gyroscope via the offset provides a more accurate gyroscope speed measurement.

As shown at (110), the method 100 includes implementing, via the control system, a control action for the wind turbine based on the adjusted rate gyroscope speed measurement(s). For example, if the rotor overspeed condition is detected, it may be desirable to reduce the speed of or shut down the wind turbine 10 to avoid damage and/or failure associated with overspeed condition. To this end, the control action may be implemented via the control system 26 to mitigate such damage. In an example, this may be achieved by utilizing the pitch adjustment mechanism 32 to pitch the rotor blades 22 thereby reducing the speed or shutting down the wind turbine 10. Thus, by providing a more accurate rate gyroscope measurement, overspeed conditions can be more accurately detected and, as a result, avoided with greater accuracy.

In another embodiment, the control action may include uprating or derating the drivetrain 50 via the control system 26. Such an action may be if the determined gyroscope speed measurement is indicative of overspeed or sensor failure that warrants adjusting the rating of the wind turbine 10. For example, if derating the wind turbine 10 would prevent overspeed, the control system 26 may take such action in response to a determined gyroscope speed measurement.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine, the method comprising:
   receiving, via a control system, at least one speed measurement from at least one sensor on a drivetrain of the wind turbine;
   receiving, via the control system, at least one rate gyroscope speed measurement from at least one rate gyroscope on the drivetrain of the wind turbine;
   calculating, via the control system, an offset for the at least one rate gyroscope speed measurement as a function of the at least one speed measurement;
   adjusting, via the control system, the at least one rate gyroscope speed measurement by the offset; and
   implementing, via the control system, a control action for the wind turbine based on the adjusted at least one rate gyroscope speed measurement.

2. The method of claim 1, wherein the at least one speed measurement from the at least one sensor on the drivetrain comprises at least one of a generator speed measurement or a high-resolution rotor speed measurement.

3. The method of claim 1, wherein calculating the offset for the at least one rate gyroscope speed measurement as the function of the at least one speed measurement comprises calculating the offset for the at least one rate gyroscope speed measurement as a function of the at least one speed measurement and a gearbox ratio.

4. The method of claim 3, wherein calculating the offset for the at least one rate gyroscope speed measurement as the function of the at least one speed measurement and the gearbox ratio further comprises dividing the at least one speed measurement by the gearbox ratio to obtain a quotient and subtracting the at least one rate gyroscope speed measurement from the quotient to provide the offset.

5. The method of claim 1, wherein adjusting the at least one rate gyroscope speed measurement by the offset further comprises subtracting the offset from the at least one rate gyroscope speed measurement.

6. The method of claim 1, further comprising calculating the offset based on time.

7. The method of claim 1, further comprising calculating the offset based on temperature.

8. The method of claim 1, wherein the at least one rate gyroscope comprises a plurality of rate gyroscopes with at least one of the plurality of rate gyroscopes associated with a pitch system of each rotor blade of the wind turbine.

9. The method of claim 8, wherein the at least one rate gyroscope speed measurement comprises a plurality of rate gyroscope speed measurements, wherein at least one of the plurality of rate gyroscope speed measurements is measured from each of the plurality of rate gyroscopes, wherein the method further comprises independently calculating individual offsets for the plurality of rate gyroscope speed measurements from the plurality of rate gyroscopes.

10. The method of claim 9, wherein the individual offsets are calculated at different times.

11. The method of claim 9 further comprising:
    comparing, via the control system, the individual offsets with a predetermined range; and
    adjusting, via the control system, the plurality of rate gyroscope speed measurements by the corresponding individual offsets using any of the individual offsets that are within the predetermined range.

12. The method of claim 1, wherein implementing, via the control system, the control action comprises at least one of uprating or derating the drivetrain via the control system, pitching at least one rotor blade of the wind turbine via a pitch adjustment mechanism controlled by the control system, reducing a speed of the wind turbine or shutting down the wind turbine when the adjusted at least one rate gyroscope speed measurement is indicative of an overspeed condition.

13. A system for controlling a wind turbine, the system comprising:
- at least one sensor mounted to a drivetrain of the wind turbine;
- at least one rate gyroscope mounted to the drivetrain of the wind turbine; and
- a control system comprising at least one processor configured to perform a plurality of operations, the plurality of operations comprising:
  - receiving at least one speed measurement from the at least one sensor on the drivetrain of the wind turbine;
  - receiving at least one rate gyroscope speed measurement from the at least one rate gyroscope on the drivetrain of the wind turbine;
  - calculating an offset for the at least one rate gyroscope speed measurement as a function of the at least one speed measurement;
  - adjusting the at least one rate gyroscope speed measurement by the offset; and
  - implementing, via the control system, a control action for the wind turbine based on the adjusted at least one rate gyroscope speed measurement.

14. The system of claim 13, wherein the at least one speed measurement from the at least one sensor on the drivetrain comprises at least one of a generator speed measurement or a high-resolution rotor speed measurement.

15. The system of claim 13, wherein calculating the offset for the at least one rate gyroscope speed measurement as the function of the at least one speed measurement further comprises dividing the at least one speed measurement by a gearbox ratio to obtain a quotient and subtracting the at least one rate gyroscope speed measurement from the quotient to provide the offset.

16. The system of claim 13, wherein adjusting the at least one rate gyroscope speed measurement by the offset further comprises subtracting the offset from the at least one rate gyroscope speed measurement.

17. The system of claim 13, wherein the control system is further configured to calculate the offset based on time or temperature.

18. The system of claim 13, wherein the at least one rate gyroscope comprises a plurality of rate gyroscopes with at least one of the plurality of rate gyroscopes associated with a pitch system of each rotor blade of the wind turbine.

19. The system of claim 18, wherein the at least one rate gyroscope speed measurement comprises a plurality of rate gyroscope speed measurements, wherein at least one of the plurality of rate gyroscope speed measurements is measured from each of the plurality of rate gyroscopes, wherein the plurality of operations further comprises independently calculating individual offsets for the plurality of rate gyroscope speed measurements from the plurality of rate gyroscopes, wherein the individual offsets are calculated at different times.

20. The system of claim 13, wherein implementing, via the control system, the control action comprises at least one of uprating or derating the drivetrain via the control system, pitching at least one rotor blade of the wind turbine via a pitch adjustment mechanism controlled by the control system, reducing a speed of the wind turbine or shutting down the wind turbine when the adjusted at least one rate gyroscope speed measurement is indicative of an overspeed condition.

* * * * *